Sept. 30, 1930.  H. JUNKERS  1,776,811
NAVIGATION OF AIRCRAFT
Original Filed Jan. 21, 1927   2 Sheets-Sheet 1
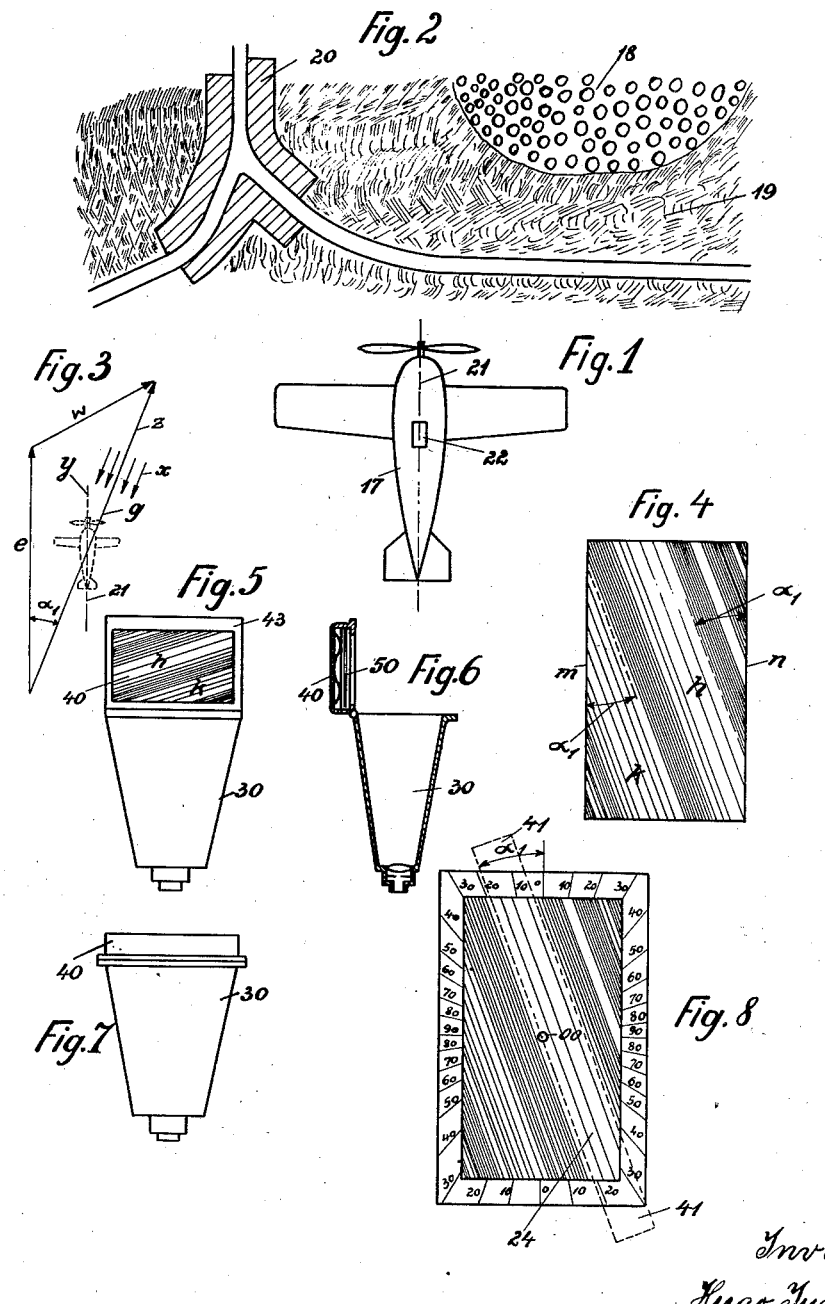

Sept. 30, 1930.    H. JUNKERS    1,776,811
NAVIGATION OF AIRCRAFT
Original Filed Jan. 21, 1927    2 Sheets-Sheet 2
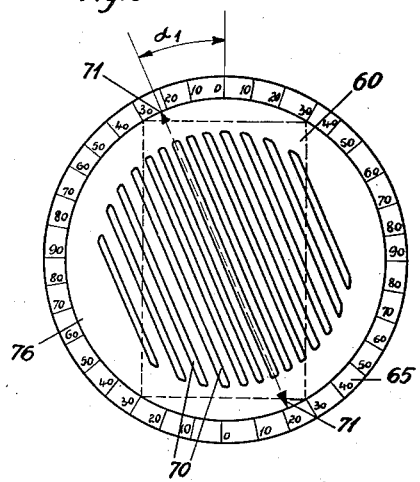
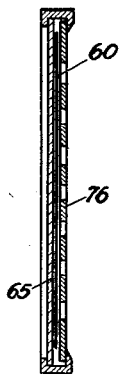
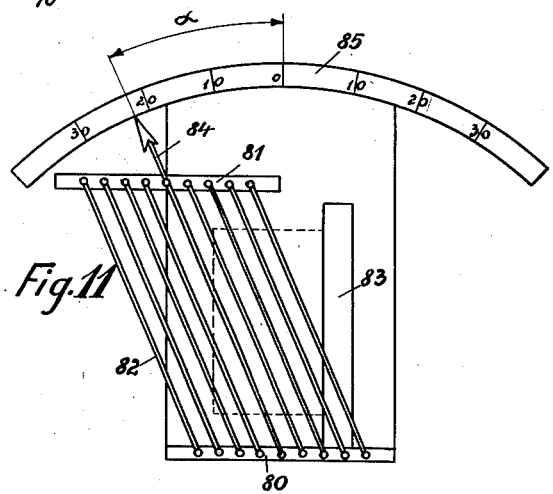
Inventor:
Hugo Junkers
by _____
Atty.

Patented Sept. 30, 1930

1,776,811

UNITED STATES PATENT OFFICE

HUGO JUNKERS, OF DESSAU, GERMANY

NAVIGATION OF AIRCRAFT

Original application filed January 21, 1927, Serial No. 162,562, and in Germany January 21, 1926. Divided and this application filed March 21, 1928. Serial No. 263,492.

This application is a division of my copending application Ser. No. 162,562, filed Jan. 21, 1927.

My invention refers to the navigation of aircraft and has particular reference to means for ascertaining during the flight of the craft the angle of deviation at any particular moment.

As is well known to those skilled in the art it becomes frequently necessary to ascertain the angle of deviation of the craft, i. e. the angle enclosed between the longitudinal axis of the craft and the direction of course above ground. The methods hitherto adopted for this purpose require a direct observation of the displacement of ground as compared with the compass course, i. e. with the position of the longitudinal axis of the aircraft. This mode of observation is, however, disadvantageous in cases where the pilot himself is required to effect the observation quickly and accurately, the pilot's attention being taken up with the maintainance of equilibrium and the observation of other instruments.

According to this invention the angle of deviation is ascertained in a particularly advantageous manner, a direct observation of the displacement of ground relative to the compass course being dispensed with by exposing to light during a certain time a sensitive layer of material which has a predetermined position relative to the longitudinal axis of the craft, thereby producing an image which embodies an arrangement of bands corresponding to the darker or lighter parts of the ground, these bands allowing ascertaining the angle of deviation.

The pilot is thus only required to release the shutter of the respective device, which may be a photographic camera and is now in a position to read off the exposure in a short space of time the angle of deviation without the other observations being in any way disturbed thereby.

In order to further facilitate the measuring of the angle, I may for instance provide a camera, the optical axis of which is directed vertically towards the ground, and a dark slide containing a pile of sensitized sheets of paper, the lowermost of which is ready to be exposed and can be withdrawn or, after opening the dark slide, can be torn off after exposure, whereupon the camera admits at once of another measurement without it being necessary to insert a fresh sheet of sensitized paper in the camera. The angle of deviation can now be read off directly from the exposed sheet for instance by means of a graduation printed on the sheet itself or by means of separate devices, for instance a grate of parallel lines adapted to be secure above the exposed sheet which is mounted on a carrier in a predetermined position, the grate being adapted to be rotated and being adjusted in parallel to the bands shown on the sheet, whereupon the angle of deviation can be read off a scale.

No fixation of the sensitized layer is required as the reading can be effected very quickly. The new process involves the particular advantage of being independent from momentous deviations of the course of the craft, which would for instance disturb the direct observation of the displacement of ground, but do not play any role in the present case in view of the compensating effect of the exposure extending over a longer space of time.

In the drawings affixed to this specification and forming part thereof, means embodying my invention are illustrated diagrammatically by way of example.

In the drawings,

Figs. 1–11 illustrate a particularly advantageous manner of ascertaining the angles of deviation, Fig. 1 being a plan view of an aircraft, Fig. 2 a similar view of part of the ground, Fig. 3 a triangle of velocity, Fig. 4 part of a photographic image, Fig. 5 is a side view of a photographic camera with the dark slide and sensitive layer at right angles to their normal position, Fig. 6 being a longitudinal section thereof, Fig. 7 is a side view showing the parts in normal position, Fig. 8 shows a photographic card with figures and angles printed thereon, Figs. 9 and 10 are a plan view and crosssection, respectively, of an angle-measuring instrument and Fig. 11 is a plan view of another form of such instrument.

At the moment where the angle of deviation shall be measured, the craft 17 shown in Fig. 1 may be assumed to travel above the ground illustrated in Fig. 2, which is characterized substantially by a wood 18, fields 19 and a village 20. The longitudinal axis 21 of the craft may be assumed to point in the direction $y$, the actual course having, in consequence of sidewind $w$ (in Fig. 3), the direction $z$. The ground will therefore be displaced relative to the craft in the direction of the arrows $x$ (Fig. 3) parallel to $z$.

On the craft is now mounted a photographic camera 22 in such manner that the main axis of light and the longitudinal edges of the image extend in parallel to the longitudinal axis 21 of the craft. If, when travelling over the ground shown in Fig. 2, a layer sensitive to light is exposed for a short time, for instance during $\frac{1}{2}$–1 minute in this camera, then, provided that the sensitivity to light is chosen in accordance to the intensity of exposure, there will appear on the sensitive layer, as shown in Fig. 4, a lighter band $h$ corresponding to the dark wood 18 and at some distance a darker band $k$ corresponding to the village 20, the direction of which encloses with the lateral edges $m$, $n$ of the layer, which are parallel to the longitudinal axis 21 of the craft, the angle of deviation $a_1$, which can now be easily read off, for instance by means of an angle-measuring device.

A camera such as can be used for producing such images is illustrated in Figs. 5 and 7. The camera 30 here shown is provided with a hinged dark slide 40 containing a block 50 of sensitive paper. When the dark slide is in raised position, as is shown in Fig. 6, the angle of deviation can also be observed directly, for instance by means of a ground glass frame placed in the plane of image. The angle can be read from the exposed photograph either in the position of the dark slide shown in the drawing or after withdrawing or tearing off the respective piece of paper.

In order to facilitate the measuring of angle, I can provide an angular graduation printed on the marginal portion of the card or paper, as shown in Fig. 8. For the purpose of measuring the angle I merely place a rule 41 (shown in dotted lines) onto the card in such manner that its edge 24 extends across the centre 00 of the card and in parallel to the bands. The angle $a_1$ can now be read off directly from the graduation between the main axis 21 of the card and the edge 24 of the rule. The angular graduation can, however, also be provided on a separate frame surrounding the card or on the frame 43 of the dark slide 40.

In the instrument illustrated in Figs. 9 and 10 the exposed card 60 is placed on a plate 65 provided with a circular scale, its main axis extending across the zero points of the scale. Above the plate and the photogram is mounted for rotation a disc 76 with marks 71 and carrying a grid 70 of parallel links. These links are now adjusted in parallel to the bands on the photogram by turning the disc 76 and the marks 71 now indicate the angle of deviation $a_1$ on the circular scale.

The instrument shown in Fig. 11 is provided with a fixed ledge 80, a movable ledge 81 and a number of parallel links 82 extending from one to the other ledge, the grid of links thus formed being mounted above the photogram, which is held in position by an abutment 83. The links 82 are adjusted in parallel to the bands visible on the photogram. An extension 84 of one of the links 82 cooperates after the manner of a pointer with the circular scale 85.

I wish it to be understood that I do not desire to be limited to the exact details of construction shown and described for obvious modifications will occur to a person skilled in the art.

I claim:—

Method for ascertaining from a flying aircraft the angle enclosed between the longitudinal axis of the craft and the direction of course above ground, comprising making a time exposure of the ground on a sensitive layer fixed on the craft with one edge in a predetermined position relative to the longitudinal axis of the craft, thereby producing an image which embodies an arrangement of bands corresponding to the darker and lighter parts of the ground, respectively, and measuring the angle enclosed between said bands and said edge.

In testimony whereof I affix my signature.

HUGO JUNKERS.